United States Patent
Westlund et al.

(10) Patent No.: US 11,414,060 B2
(45) Date of Patent: Aug. 16, 2022

(54) METHOD AND VEHICLE FOR ACTIVATING AN AUTONOMOUS BRAKING MANEUVER

(71) Applicant: VOLVO CAR CORPORATION, Gothenburg (SE)

(72) Inventors: Mathias Westlund, Lerum (SE); Jonas Nilsson, Molndal (SE)

(73) Assignee: VOLVO CAR CORPORATION, Gothenburg (SE)

( * ) Notice: Subject to any disclaimer, the term of this patent is extended or adjusted under 35 U.S.C. 154(b) by 506 days.

(21) Appl. No.: 16/015,362

(22) Filed: Jun. 22, 2018

(65) Prior Publication Data
US 2019/0001941 A1 Jan. 3, 2019

(30) Foreign Application Priority Data
Jun. 29, 2017 (EP) .................... 17178605

(51) Int. Cl.
*B60T 8/00* (2006.01)
*B60T 8/17* (2006.01)
*B60T 7/12* (2006.01)
*B60T 7/02* (2006.01)
*G05D 1/00* (2006.01)

(52) U.S. Cl.
CPC .......... *B60T 8/1701* (2013.01); *B60T 7/02* (2013.01); *B60T 7/12* (2013.01); *G05D 1/0088* (2013.01); *B60T 2201/02* (2013.01); *G05D 2201/0213* (2013.01)

(58) Field of Classification Search
None
See application file for complete search history.

(56) References Cited

U.S. PATENT DOCUMENTS

| 9,298,184 | B2 | 3/2016 | Bartels et al. |
| 9,523,984 | B1* | 12/2016 | Herbach .......... G05D 1/0088 |
| 9,566,958 | B2 | 2/2017 | Waldmann |
| 9,580,080 | B1* | 2/2017 | Letwin .......... B60W 50/082 |
| 9,919,708 | B2 | 3/2018 | Pallett et al. |

(Continued)

FOREIGN PATENT DOCUMENTS

| CN | 102556032 A | 7/2012 |
| CN | 104680835 A | 6/2015 |

(Continued)

OTHER PUBLICATIONS

Chinese Office Action dated Jun. 11, 2020, Application No. 201810654018.1, 8 Pages.

(Continued)

*Primary Examiner* — Truc M Do
(74) *Attorney, Agent, or Firm* — Brooks Kushman P.C.

(57) ABSTRACT

Embodiments herein relate to a method performed by an autonomous vehicle for activating an autonomous braking maneuver of the autonomous vehicle having an autonomous drive system. The autonomous vehicle detects at least one user initiated request for an autonomous braking maneuver of the vehicle when the vehicle is in a first autonomous drive mode at a speed. The autonomous braking maneuver is at least one of: speed reduction or stop. When the request has been detected, the autonomous vehicle activates the autonomous braking maneuver of the vehicle which reduces the speed and/or brakes the vehicle to a stop.

15 Claims, 5 Drawing Sheets

(56) References Cited

U.S. PATENT DOCUMENTS

| | | | |
|---|---|---|---|
| 9,932,038 B1* | 4/2018 | Zhu | B60T 8/17 |
| 9,983,582 B2 | 5/2018 | Nemec et al. | |
| 10,241,509 B1* | 3/2019 | Fields | B60W 30/09 |
| 2007/0198145 A1* | 8/2007 | Norris | G05D 1/021 |
| | | | 701/23 |
| 2012/0123644 A1* | 5/2012 | Waldmann | B60T 7/042 |
| | | | 701/45 |
| 2014/0156134 A1* | 6/2014 | Cullinane | B60R 1/00 |
| | | | 701/23 |
| 2015/0120124 A1 | 4/2015 | Bartels et al. | |
| 2015/0149265 A1 | 5/2015 | Huntzicker et al. | |
| 2016/0318490 A1* | 11/2016 | Ben Shalom | B60T 7/18 |
| 2016/0349750 A1* | 12/2016 | Nemec | B60K 35/00 |
| 2017/0090480 A1* | 3/2017 | Ho | G05D 1/0027 |
| 2018/0229738 A1* | 8/2018 | Nilsson | G05D 1/021 |
| 2018/0334038 A1* | 11/2018 | Zhao | B60K 6/48 |

FOREIGN PATENT DOCUMENTS

| | | |
|---|---|---|
| CN | 105270414 A | 1/2016 |
| CN | 106255933 A | 12/2016 |
| DE | 10 2013 222 048 A1 | 4/2015 |

OTHER PUBLICATIONS

Extended European Search Report dated Dec. 8, 2017, Application No. 17178605.6-1762, Applicant Volvo Car Corporation, 7 Pages.

\* cited by examiner

METHOD AND VEHICLE FOR ACTIVATING AN AUTONOMOUS BRAKING MANEUVER

CROSS-REFERENCE TO RELATED APPLICATIONS

This application claims foreign priority benefits under 35 U.S.C. § 119(a)-(d) to European patent application number EP 17178605.6, filed Jun. 29, 2017, now European Patent No. EP 3 421 308 B1, issued Aug. 11, 2021, which is incorporated by reference in its entirety.

TECHNICAL FIELD

Embodiments herein relate generally to an autonomous vehicle and a method performed by the autonomous vehicle. More particularly the embodiments herein relate to activating an autonomous braking maneuver of the autonomous vehicle having an autonomous drive system.

BACKGROUND

In a near future, autonomous vehicles may be responsible for driving in arbitrarily complex traffic environments. The traditional driver may become a rider of the vehicle or even a customer in a self-driving shuttle without any driver present. One can imagine scenarios where the rider would like to override the vehicle and stop quickly. Hence, it is reasonable that the riders request access to an emergency stop switch of some sort, e.g., a train style emergency stop handle, etc.

In a manually driven vehicle, the driver can request an emergency braking in speed via the Electronic Parking Brake (EPB) switch. An example of an emergency braking system in a manual driven vehicle is illustrated in FIG. 1. The user of the vehicle (e.g., the driver or the passenger) can request a stop 101 by e.g., pressing an EPB button. The vehicle then starts the brake control 102 and brakes using primarily the service brakes 103, if available, as long as the driver pushes the EPB button. If the service brakes 103 are not available e.g., due to a hydraulic system failure, the vehicle uses the EPB 104 to stop. Thus, the stop is performed primarily with service brakes 103 if available and secondarily via dynamic braking with EPB 104. This maneuver is a very basic maneuver with simple longitudinal deceleration and the driver still needs to actively control the lateral movement of the vehicle. Hence, for an autonomous vehicle this emergency maneuver is not sufficient, in particular if there is no driver or even steering wheel.

The service brake in a vehicle may be described as the primary braking system. The service brake is typically operated by foot. The service brake is used in ordinary driving of the vehicle, compared to e.g., the emergency braking system. The emergency braking system, also referred to as a parking brake, or a hand brake, is a braking system that can be used in the event of failure of the service brake and to keep the vehicle from rolling when parked. The EPB 104 is an example of an emergency braking system. In an electronic parking brake system, the EPB 104 is activated by activating an electrical switch or button.

There are today no good interfaces for the user of an autonomous vehicle to stop the vehicle with autonomous support. Currently, focus is on function development with safety drivers observing the self-driving vehicle. Therefore, there is a need to at least mitigate or solve this issue.

SUMMARY

An objective of embodiments herein is therefore to obviate at least one of the above disadvantages and to provide improved braking of an autonomous vehicle.

According to a first aspect, the object is achieved by a method performed by an autonomous vehicle for activating an autonomous braking maneuver of the autonomous vehicle having an autonomous drive system. The autonomous vehicle detects at least one user initiated request for an autonomous braking maneuver of the vehicle when the vehicle is in a first autonomous drive mode at a speed. The autonomous braking maneuver is at least one of: speed reduction or stop. When the request has been detected, the autonomous vehicle activates the autonomous braking maneuver of the vehicle which reduces the speed and/or brakes the vehicle to a stop.

According to a second aspect, the object is achieved by an autonomous vehicle for activating an autonomous braking maneuver of the autonomous vehicle having an autonomous drive system. The autonomous vehicle is configured to detect at least one user initiated request for an autonomous braking maneuver of the vehicle when the vehicle is in a first autonomous drive mode at a speed. The autonomous braking maneuver is at least one of: speed reduction or stop. The autonomous vehicle is configured to, when the request has been detected, activate the autonomous braking maneuver of the vehicle which reduces the speed and/or brakes the vehicle to a stop.

Since there is enabled a user initiated request to activate an autonomous braking maneuver of the vehicle, the speed of the autonomous vehicle can be reduced and/or it can be braked to a stop. Thus, improved braking of an autonomous vehicle is provided.

Embodiments herein afford many advantages, of which a non-exhaustive list of examples follows:

An advantage of the embodiments herein is that a user of the autonomous vehicle has access to an emergency stop switch of some sort, which may be necessary if the user has a need to override the vehicle and stop quickly.

Another advantage of the embodiments herein is that the already existing EPB button may be upgraded with an autonomous safe stop, controlling both longitudinal and lateral control of the vehicle. Thus, it is not necessary to implementing a separate button for the embodiments herein.

Another advantage of the embodiment is that pressing the EPB button includes a primary autonomous safe stop function, but also that it hosts a manual function to brake the vehicle in case of autonomy system unavailability. Hence, there is enabled a single user interface for emergency stopping using either autonomous control to stop e.g., in lane or manual controlled braking to stop.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the attached drawings.

The drawings are not necessarily to scale and the dimensions of certain features may have been exaggerated for the sake of clarity. Emphasis is instead placed upon illustrating the principle of the embodiments herein.

DETAILED DESCRIPTION

There may be scenarios when the user of an autonomous vehicle needs to override the vehicle and stop quickly. For example, if the user is uncomfortable with the autonomous vehicle's driving, or if the autonomous system loses control, or if there is a fire in the vehicle. Hence, it is reasonable that the user can request access to an emergency stop switch of some sort, e.g., a train style emergency stop handle or simply reuse existing button such as electronic parking brake (EPB) activation. Such an emergency button aims at quickly deactivating the self-driving function of the vehicle and allowing the user to control the situation.

Figure 1:
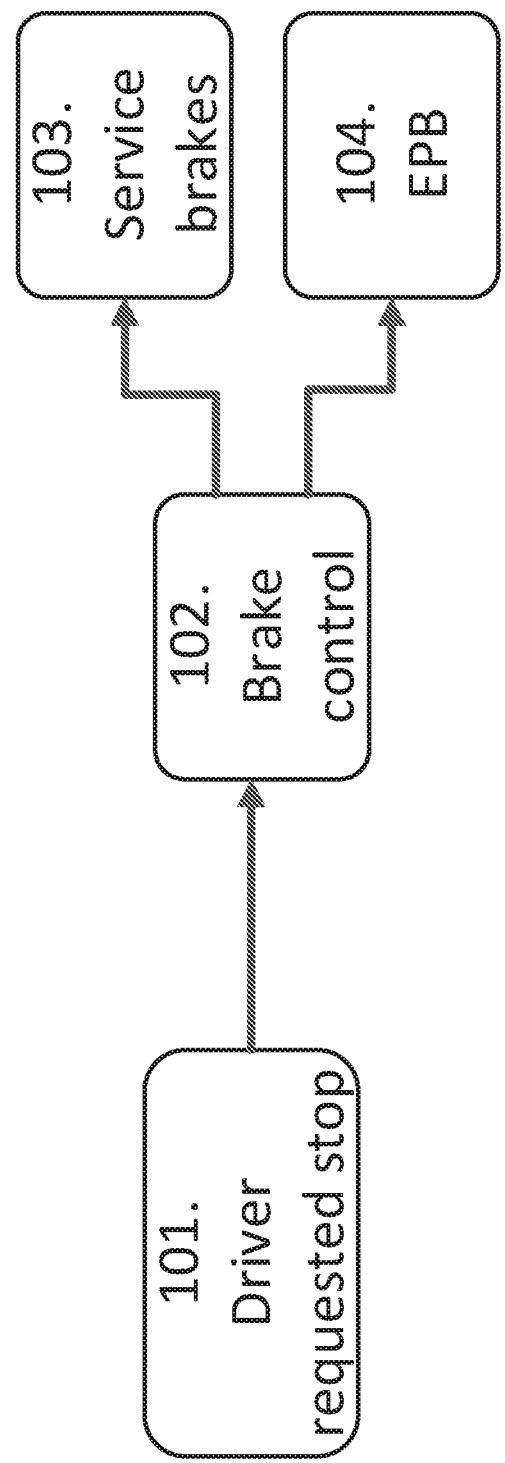
FIG. 1 is a flow chart illustrating embodiments of an emergency braking system in a manual driven vehicle.
Figure 2:
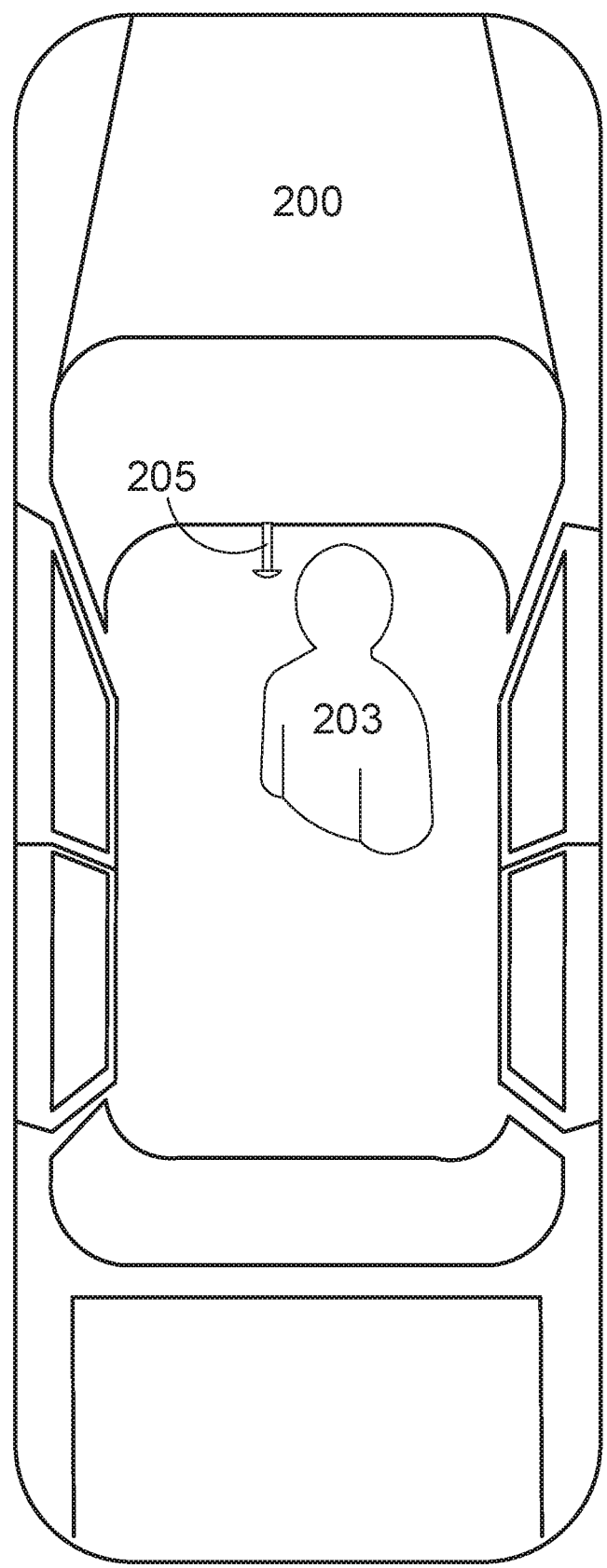
FIG. 2 is a schematic block diagram illustrating a vehicle.

FIG. 2 illustrates a vehicle 200. There may be one or more users 203 onboard the vehicle 200 (only one user 203 is illustrated in FIG. 2 as an example).

The vehicle 200 may be any arbitrary vehicle, for instance a car, truck, lorry, van, bus, motorcycle, etc. The vehicle 200 is adapted to be—at least during certain conditions—completely autonomous, driverless or self-driven. An autonomous vehicle 200 may be described as a vehicle which performs all the driving, e.g., the vehicle performs steering, braking and acceleration. The user(s) 203 on board the vehicle 200 does not have control of the vehicle 200, i.e., the user 203 does not perform the driving of the vehicle 200.

When the vehicle 200 is an autonomous vehicle, the user 203 is a passenger of the vehicle 200. The user 203 may also be described as an occupant of the vehicle 200. An autonomous vehicle 200 does not have any driver since the vehicle 200 itself performs all the driving. The user 203 is therefore not the driver in an autonomous vehicle 200.

The vehicle 200 may be in different autonomous drive modes, e.g., a first autonomous drive mode or a second autonomous drive mode. When the vehicle 200 is in a drive mode the vehicle's engine is running and the vehicle 200 is moving at a certain speed. In the first autonomous drive mode, the vehicle 200 is driving autonomously, i.e., without any involvement by the user 203. In the second autonomous drive mode, the vehicle 200 is still driving autonomously, but at a speed which is reduced as compared to the speed in the first autonomous drive mode in order for the user 203 to feel safe, i.e., for the user 203 to detect if something that initially seemed to be a vehicle fault in fact is a critical fault or if it was a false alarm, or if a traffic situation in which the user 203 experienced that the vehicle 200 was driving inappropriate (e.g., if the user 203 experienced discomfort, if the user 203 experienced a lack of trust in the autonomous driving, etc.) has passed and the user 203 therefore wants the vehicle 200 to resume to the first autonomous drive mode, e.g., normal autonomous driving, etc.

The first autonomous drive mode may also be referred to as a normal autonomous drive mode, a standard autonomous drive mode, etc. The second autonomous drive mode may also be referred to as a reduced autonomous drive mode, a slow autonomous drive mode or a temporary autonomous drive mode, etc.

The vehicle 200 may comprise a brake triggering device 205 configured to be used by the user 203 to trigger braking of the vehicle 100, i.e., to activate a braking maneuver. The brake triggering device 205 may be in the form of a switch, a button, a handle, a lever or similar. The brake triggering device 205 may also be referred to as an emergency stop switch, an EPB button, etc.

The autonomous vehicle 200 may comprise an autonomous drive system, a brake control system, an autonomous control system, service brakes, parking brake (e.g., EPB), steering system, etc. (not illustrated in FIG. 2).

Figure 3:
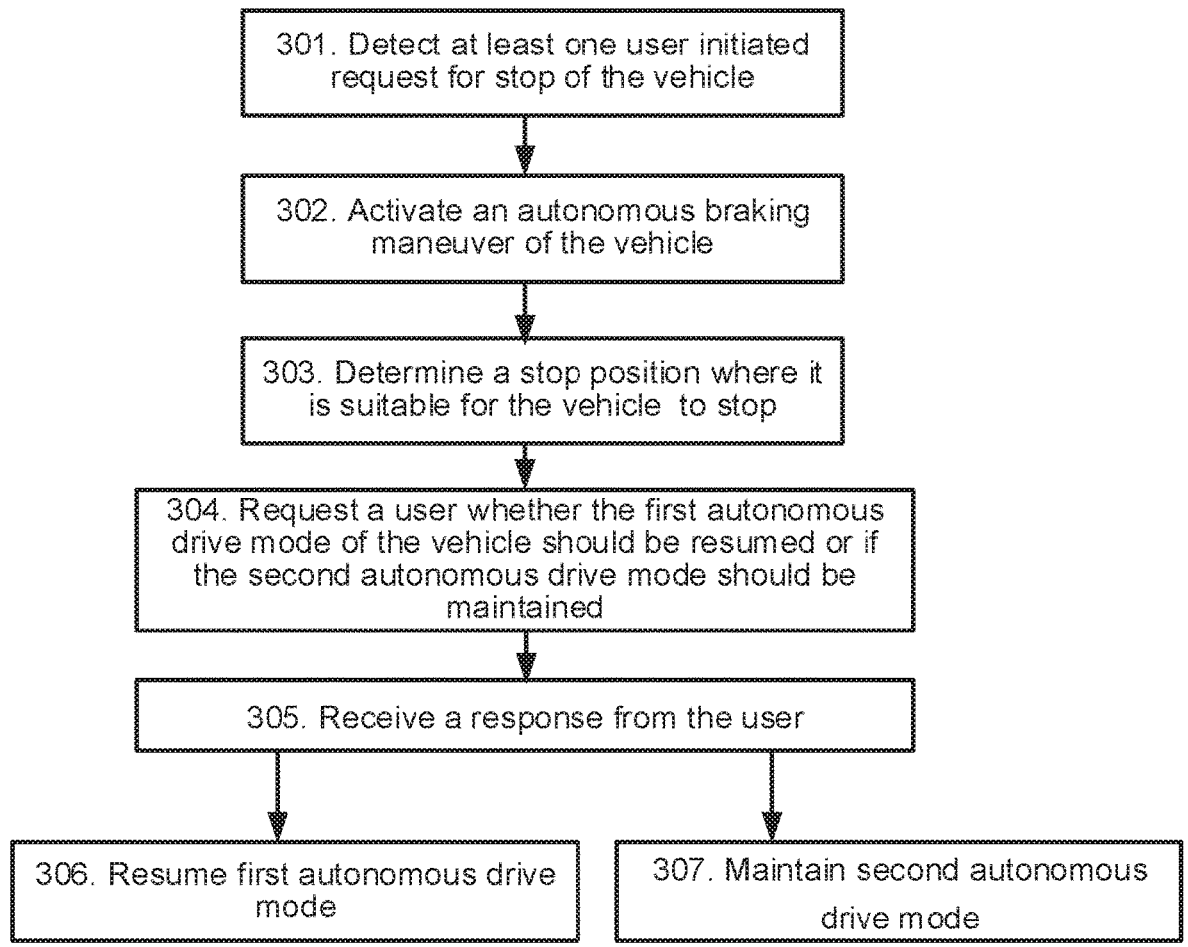
FIG. 3 is a flow chart illustrating embodiments of a method.

The method for activating an autonomous braking maneuver of the autonomous vehicle 200 having an autonomous drive system will now be described—according to some embodiments—with reference to the flowchart depicted in FIG. 3. The method comprises at least one of the following steps, which steps may as well be carried out in another suitable order than described below:

Step 301

The autonomous vehicle 200 detects at least one user initiated request for an autonomous braking maneuver of the vehicle 200 when the vehicle 200 is in a first autonomous drive mode at a speed greater than 0 kilometers per hour (kph), such as a speed greater than 80 kph or greater than 120 kph. The autonomous braking maneuver is at least one of: speed reduction or stop of the vehicle 200. The first autonomous drive mode is a drive mode in which the vehicle 200 is moving (i.e., it has a certain speed) and also performs all the driving, e.g., the vehicle performs steering, braking and acceleration.

As mentioned above, there may be at least one user initiated request. In an example where there are two user initiated requests, a first user initiated request may activate the autonomous braking maneuver which reduces the speed, and a second user initiated request following the first user initiated request may brake the vehicle 200 from the reduced speed to a stop.

The user initiated request may be initiated by the user 203 by activating a brake triggering device 205 comprised in the vehicle 200. The brake triggering device 205 may be a dedicated autonomous brake triggering device. The brake triggering device 205 may be EPB activation device. The activating a brake triggering device 205 may comprises arbitration between activating the autonomous braking maneuver and activating an EPB dynamic braking maneuver. A first user initiated request may activate the autonomous braking maneuver and a second user initiated request may activate the EPB dynamic braking maneuver. The user initiated request may initially activate the autonomous braking maneuver and may activate the EPB dynamic braking maneuver when the user initiated request lasts for a time period, such as at least 2 seconds or at least 1 second. Thus, the user initiated request may enable arbitration or alternation between the autonomous braking maneuver and a dynamic braking maneuver by the dynamic braking system of the vehicle 200.

For example, the autonomous vehicle 200 may comprise an EPB device 205 in which the autonomous braking maneuver function is co-hosted together with a dynamic braking function. The dynamic braking maneuver is defined as the manually controlled braking, via the EPB button interface, using primarily the service brakes to brake when operational and secondarily the EPB actuator to brake. The user initiated request may then be initiated by the user 203 by activating the EPB device 205. In other words, the vehicle 200 may comprise a dynamic braking functionality controlled via the brake triggering device 205 (e.g., an EPB device), and an arbitration between an autonomous braking maneuver and the dynamic braking functionality may be performed. The arbitration between an autonomous braking maneuver and the dynamic braking functionality may be such that a user initiated request lasting for a short time period may result in an autonomous braking maneuver and a user initiated request lasting for a long time period (e.g., a continuous push of the device 205) may result in a manual dynamic braking action via the EPB activation interface.

Step 302

When the request has been detected by the vehicle 200, it activates the autonomous braking maneuver of the vehicle 200 which reduces the speed and/or brakes the vehicle 200 to a full stop. The speed to which the vehicle 200 is reduced may be determined by the vehicle 200 itself.

The vehicle 200 may be in a second autonomous drive mode when the vehicle 200 is driving at the reduced speed. The reduced speed is lower as compared to the speed at which the vehicle 200 is moving when it is at the first autonomous drive mode.

The autonomous braking maneuver may brake the vehicle 200 to a stop when the user initiated request lasts for a time period.

The autonomous braking maneuver may comprise autonomous control of at least one of longitudinal and lateral movement of the vehicle 200. Consequently, the autonomous braking maneuver is manually initiated by the user and performed with autonomous support. This longitudinal and lateral movement control of the vehicle is autonomous, i.e., the user 203 does not control the movement. The user 203 only triggers the braking maneuver. The vehicle 200 may therefore be configured to autonomously determine and control the longitudinal and lateral movement.

Activating the autonomous braking maneuver changes the autonomous drive mode of the vehicle 200 from the first autonomous drive mode to the second autonomous drive mode. In the second autonomous drive mode, the vehicle 200 is still driving fully autonomously, but with a less aggressive driving strategy compared to the first autonomous drive mode, e.g., by driving with a reduced speed. As a last resort if the autonomous system fails, the user 203 may manually use the EPB to brake the vehicle 200.

Step 303

Before the autonomous braking maneuver brakes the vehicle 200 to a stop, the vehicle 200 may determine a stop position where it is suitable for the vehicle 200 to stop, for example at the side of the road.

Step 304

When the vehicle 200 is in the second autonomous drive mode and when the autonomous drive system is substantially fault free, the vehicle 200 may request of a user 203 whether the first autonomous drive mode of the vehicle 200 should be resumed or if the second autonomous drive mode should be maintained.

Step 305

The vehicle 200 may receive a response from the user 103 that the first autonomous drive mode should be resumed or that the second autonomous drive mode should be maintained.

Steps 306-307

Based on the response, the vehicle 200 may resume the first autonomous drive mode of the vehicle 200 or maintain the second autonomous drive mode. Thus, if the response in step 405 indicates that first autonomous drive should be resumed, the vehicle 200 resumes the first autonomous drive mode. If the response in step 405 on the other hand indicates that the second autonomous drive mode should be maintained, the vehicle 200 maintains driving in the second autonomous drive mode.

Figure 4:
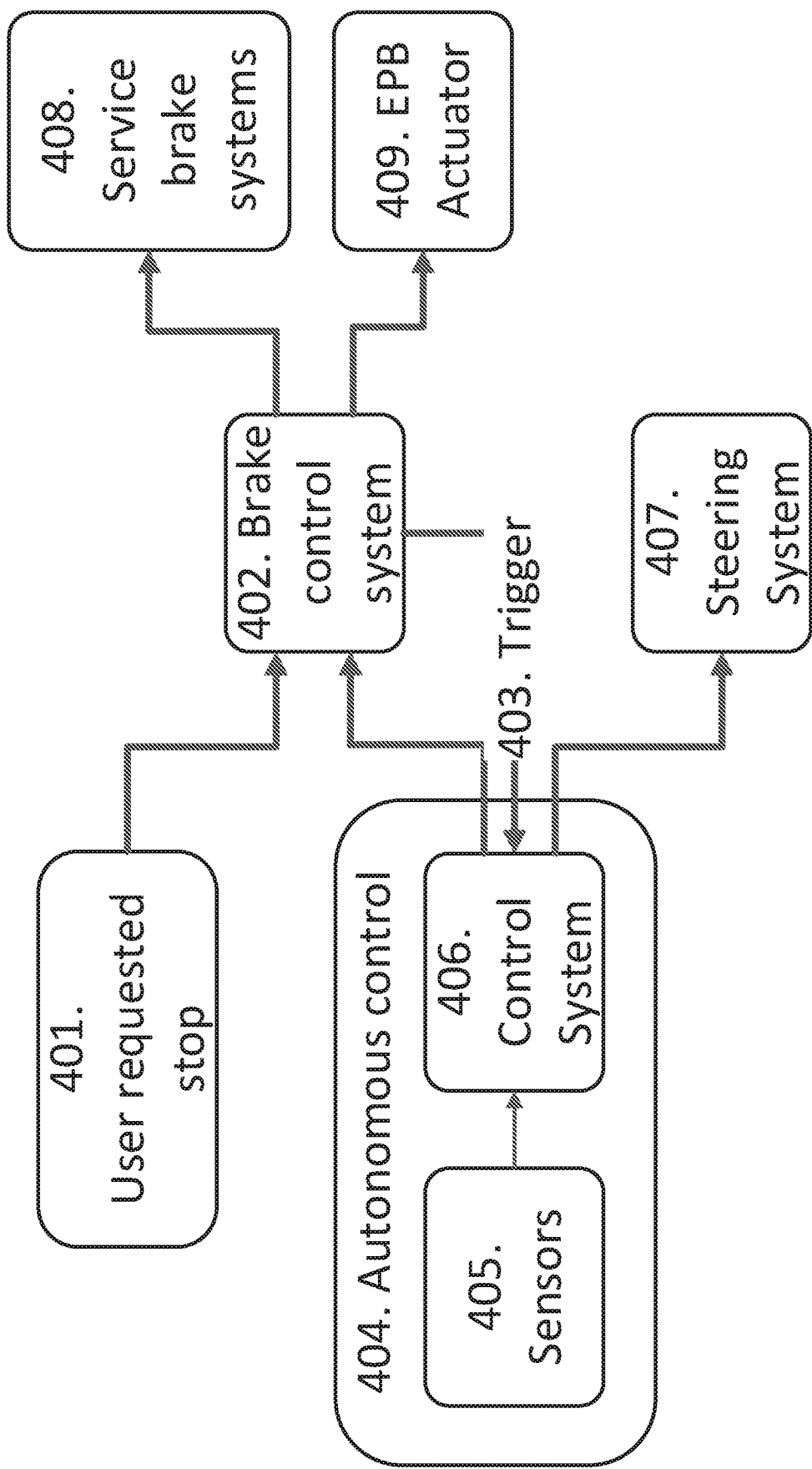
FIG. 4 is a flow chart illustrating embodiments of a user triggered autonomous stop.

FIG. 4 illustrates an overview of the user triggered autonomous stop of the vehicle 200. The user 203 requests a safe autonomous stop 401 (corresponding to step 301 in FIG. 3) of the vehicle 200 to the brake control system 402 by activating the brake triggering device 205. The brake triggering device 205 may be activated via the EPB interface. The brake control system 402 may then first trigger 403 an autonomous stop of the vehicle 200 where the autonomous control system 404 may command both longitudinal and lateral motion to stop the vehicle 200 in a suitable position. The autonomous control system 404 may be composed of a set of sensors 405 designed to observe the vehicle surrounding environment and the current state of the vehicle 200, and a control system 406 taking lateral and longitudinal control decisions to guide the vehicle 200 in the current traffic situation. The lateral control request is executed in a steering system 407 capable of executing autonomous steering requests. The longitudinal control request for deceleration is coordinated in the brake control system 402 with activation of either the normal service brake system 408 e.g., the hydraulic brake system, or the electronic parking brake (EPB) actuator 409. The autonomous control system 404 may have full sensor and actuator performance in this use case and may stop the vehicle 200 and drop of a user 203 at e.g., a curb.

If the autonomous control system 404 is malfunctioning or the user 203 wants to override the autonomous function, the user 203 can hold on to the brake triggering device 205 and reuse the existing dynamic braking logic to bring the vehicle 200 to a stop. If the autonomous control system 404 is working properly, the autonomous lateral control will continue to control the lateral motion.

In a worst-case scenario with severe autonomy failure, the brake triggering device 205 at least gives the user 203 a means to brake the vehicle 200 to stop.

The present disclosure targets a driver triggered emergency stop where the EPB switch interface may be upgraded with an autonomous safe stop controlling both longitudinal and lateral control. The autonomous braking maneuver may be integrated with the existing EPB functionality to both cover an autonomous stop and to support a manual longitudinal override in case of emergency.

The embodiments herein may combine a manual trigger of an autonomous safe stop within the same interface as an emergency braking, via e.g., the EPB switch interface. Logically, when the user 203 pushes the EPB switch button 205 (or other button, lever, handle, etc.) the brake control system 402 in the vehicle 200, recognizing the user initiated request, communicates an autonomous safe stop request to the autonomous control system 404. At the same time, the brake control system 402 may maintain the normal EPB button logic and may start braking the vehicle 200 if the switch 205 is held a certain time. The effect is that the user 203 may request an autonomous safe stop maneuver at any time. However, if the reason for the user 203 activating the EPB button 205 is an autonomous system malfunction, the user 203 can override the system by braking the vehicle 200 to a permanent stop with a long push/pull on the switch 205.

The brake triggering device 205 may be a hardware switch button (or similar) for a user initiated autonomous emergency maneuver. Abortion of the autonomous drive function via for example a mobile phone application may be feasible. Additionally or alternatively, an independent interface may be available in case the autonomous control system fails or if there are connection problems to the cloud service.

When the user 203 triggers an autonomous safe stop the vehicle 200 can behave in different ways. For example, the vehicle 200 may autonomously reduce its speed, it may autonomously stop in a safe place or it may perform a combination of first reducing the speed and then a safe stop.

Reduced speed: This may also be referred to as a second autonomous drive mode. At a first short push/pull of the brake triggering device 205 (i.e., the user initiated request), the autonomous braking maneuver may be activated by immediately triggering a reduction in speed to increase safety margins. The vehicle 200 can then either continue its task (e.g., autonomous driving) but at a lower speed compared to before the user initiated request, or search for a suitable place to stop the vehicle 200 and there terminate the ride.

When the vehicle 200 is driving in the second autonomous drive mode at a lower speed (e.g., less than 30 kph or less than 20 kph), the user 203 can resume the first autonomous drive mode, for example via an alternative Human Machine Interface (HMI) such as via an MU or a smartphone application, provided that the autonomous drive system of the vehicle 200 is sufficiently fault free. At the reduced speed in the second autonomous drive mode, the user 203 may continue to pull/push the brake triggering device 205 to manually bring the vehicle 200 to a stop for example via a standard EPB dynamic braking function. In this scenario, the vehicle 200 may just stay in the current lane. Another option is that the vehicle 200 detects the manual override (i.e., the user activated request for autonomous braking maneuver) and plan a path to a safe—e.g., the safest possible—lateral position e.g., on a road shoulder where the vehicle 200 can stop.

Safe stop: A first pull/push of the brake triggering device 205 (i.e., the user initiated request) may result in an immediately triggered safe stop within an arbitrary distance from the vehicle's 200 current position at a safe—e.g., the safest possible—lateral position e.g., on a road shoulder. The stop should be soft to avoid causing hazards from behind. The user 203 may continue to pull/push the brake triggering device 205 to manually bring the vehicle 200 to a quicker stop via standard EPB dynamic braking function.

Combination—reduced speed and safe stop: Starting with the reduced speed alternative, a second short push/pull of the brake triggering device 205 (i.e., the user initiated request) may result in the safe stop alternative. Hence, after a second user initiated request, the vehicle 200 may brake down from the reduced speed to stop at a safe—e.g., safest possible—lateral position.

Figure 5:
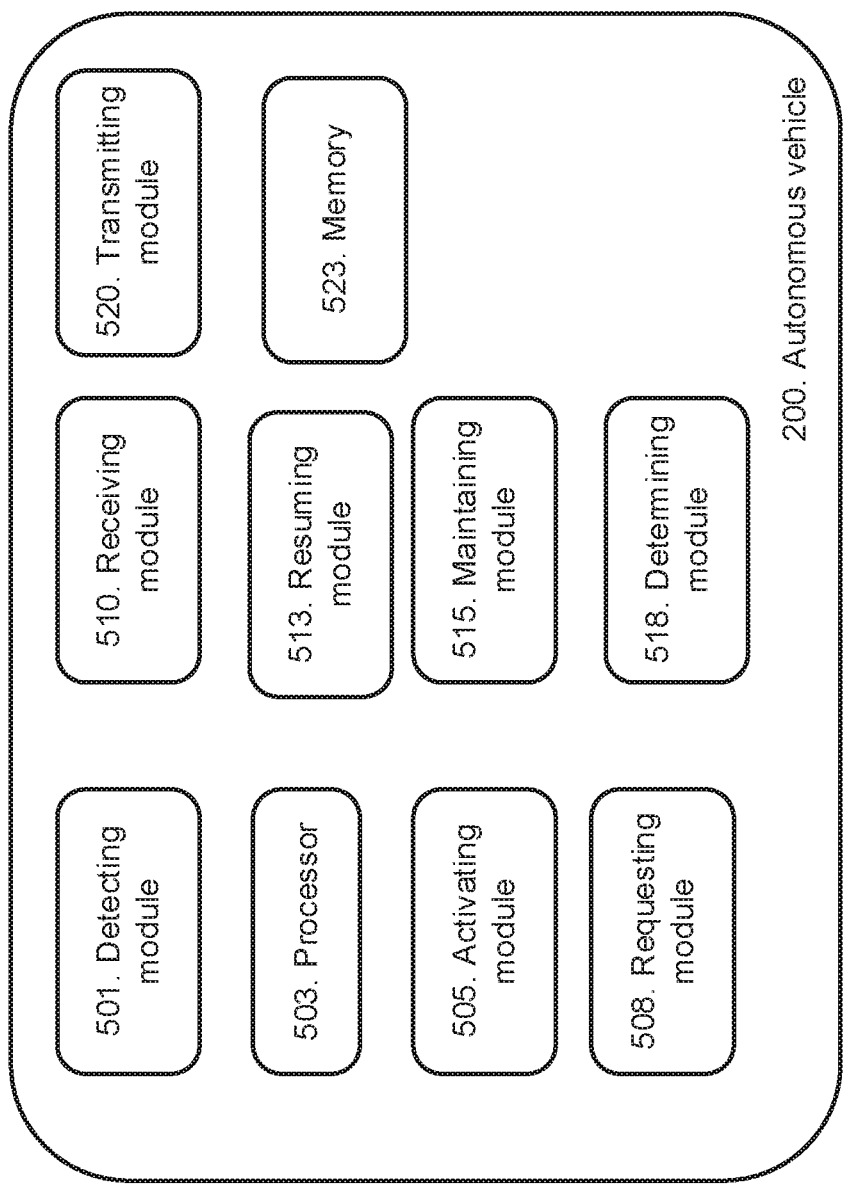
FIG. 5 is a schematic block diagram illustrating a vehicle.

To perform at least some of the method steps described above for activating an autonomous braking maneuver of the autonomous vehicle 200, the vehicle 200 may comprise an arrangement as shown in FIG. 5.

To perform at least some of the method steps described above performed by the autonomous vehicle 200 for activating an autonomous braking maneuver of the autonomous vehicle 200, the autonomous vehicle 200 is configured to detect, e.g., by means of a detecting module 501, at least one user initiated request for an autonomous braking maneuver of the vehicle 200 when the vehicle 200 is in the first autonomous drive mode at a speed. The autonomous braking maneuver is at least one of: speed reduction or stop. A first user initiated request may activate the autonomous braking maneuver which reduces the speed, and a second user initiated request following the first user initiated request may brake the vehicle 200 from the reduced speed to a stop. The user initiated request may be initiated by the user 203 by activating a brake triggering device 205 comprised in the vehicle 200. The brake triggering device 205 may be a dedicated autonomous brake triggering device. The brake triggering device 205 may be an EPB activation device. Activating the brake triggering device 205 may comprise arbitration between activating the autonomous braking maneuver and activating an EPB dynamic braking maneuver. A first user initiated request may activate the autonomous braking maneuver and a second user initiated request activates the EPB dynamic braking maneuver. The user initiated request may initially activate the autonomous braking maneuver and may activate the EPB dynamic braking maneuver when the user initiated request lasts for a time period, such as at least 2 seconds or at least 1 second. The detecting module 501 may also be referred to as a detecting unit, a detecting means, a detecting circuit, means for detecting, etc. The detecting module 501 may be a processor 503 of the autonomous vehicle 200.

The autonomous vehicle is further configured to, e.g., by means of an activating module 505, activate, when the request has been detected, the autonomous braking maneuver of the vehicle 200 which reduces the speed and/or brakes the vehicle 200 to a stop. The vehicle 200 may be in a second autonomous drive mode when the vehicle 200 is driving in the reduced speed. The autonomous braking maneuver may brake the vehicle 200 to a stop when the user initiated request lasts for a time period, such as at least 0.2 seconds or at least 0.5 seconds. The autonomous braking maneuver may comprise control of longitudinal and lateral movement of the vehicle 200. The activating module 505 may also be referred to as an activating unit, an activating means, an activating circuit, means for activating, etc. The activating module 505 may be the processor 503 of the autonomous vehicle 200.

The autonomous vehicle 200 may be configured to, e.g., by means of a requesting module 508, request a user 203 to indicate whether the first autonomous drive mode of the vehicle 200 should be resumed or if the second autonomous drive mode should be maintained. The request may be performed when the vehicle 200 is in the second autonomous drive mode and when the autonomous drive system is substantially fault free. The requesting module 508 may also be referred to as a requesting unit, a requesting means, a requesting circuit, means for requesting, etc. The requesting module 508 may be the processor 503 of the autonomous vehicle 200.

The autonomous vehicle 200 may be configured to, e.g., by means of a receiving module 510, receive a response from the user 203 indicating that the first autonomous drive mode should be resumed or that the second autonomous drive mode should be maintained. The receiving module 510 may also be referred to as a receiving unit, a receiving means, a receiving circuit, means for receiving, input unit, etc. The receiving module 510 may be a receiver, a transceiver, etc. The receiving module 510 may be a wireless receiver of the vehicle 200.

The autonomous vehicle 200 may be configured to, e.g., by means of a resuming module 513, resume, based on the response, the first autonomous drive mode of the vehicle 200 or, e.g., by means of a maintaining module 515, maintain the second autonomous drive mode. The resuming module 513 may also be referred to as a resuming unit, a resuming means, a resuming circuit, means for resuming, etc. The resuming module 513 may be the processor 503 of the autonomous vehicle 200. The maintaining module 515 may also be referred to as a maintaining unit, a maintaining means, a maintaining circuit, means for maintaining, etc. The maintaining module 515 may be the processor 503 of the autonomous vehicle 200.

The autonomous vehicle 200 may be configured to, e.g., by means of a determining module 518, determine, before the autonomous braking maneuver brakes the vehicle 200 to a stop, a stop position where it is suitable for the vehicle 200 to stop. The determining module 518 may also be referred to as a determining unit, a determining means, a determining circuit, means for determining, etc. The determining module 518 may be the processor 503 of the autonomous vehicle 200.

The autonomous vehicle 200 may be configured to, e.g., by means of a transmitting module 520, transmit data, instructions, information, messages, etc. to other modules, to a user's 203 mobile phone, to a communications network, etc. The transmitting module 520 may also be referred to as a transmitting unit, a transmitting means, a transmitting circuit, means for transmitting, output unit, etc. The transmitting module 520 may be a transmitter, a transceiver, etc. The transmitting module 520 may be a wireless transmitter of the vehicle 200.

The autonomous vehicle 200 may comprises the processor 503 and a memory 523. The memory 523 comprises instructions executable by the processor 503. The memory 523 is arranged to be used to store data, modes, speed information, requests, responses, stop position, threshold values, time periods, configurations, schedulings, and applications to perform the methods herein when being executed in the vehicle 200.

In some embodiments, a computer program may comprise instructions which, when executed on at least one processor, cause the at least one processor, e.g., the processor 503 in the vehicle 200, to carry out the method steps described above. A carrier may comprise the computer program, and the carrier is one of an electronic signal, optical signal, radio signal or computer readable storage medium.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasized that the steps of the methods defined in the appended claims may, without departing from the embodiments herein, be performed in another order than the order in which they appear in the claims.

What is claimed is:

1. A method performed by an autonomous vehicle for activating an autonomous braking maneuver of the vehicle, wherein the vehicle includes an autonomous drive system, the method comprising:
   detecting at least one request initiated by a user for an autonomous braking maneuver of the vehicle when the vehicle is in a first autonomous drive mode at a speed, wherein the autonomous braking maneuver is at least one of speed reduction or stop; and
   when a first request initiated by the user has been detected, activating the autonomous braking maneuver to reduce the speed of the vehicle to a reduced speed without stopping the vehicle, and when a second request initiated by the user has been detected following the first request, causing autonomous braking of the vehicle from the reduced speed to a stop;
   wherein the vehicle is in a second autonomous drive mode when the vehicle is driving at the reduced speed, and wherein the method further comprises:
   detecting whether the autonomous drive system is fault free;
   when the autonomous drive system is fault free and the vehicle is in the second autonomous drive mode, requesting input from a user indicating whether the first autonomous drive mode of the vehicle should be resumed;
   when the autonomous drive system is fault free and the vehicle is in the second autonomous drive mode, requesting input from the user indicating whether the second autonomous drive mode should be maintained;
   receiving via user activation of an input unit a user response indicating that the first autonomous drive mode should be resumed or that the second autonomous drive mode should be maintained; and
   based on the user response received via user activation of the input unit, resuming the first autonomous drive mode or maintaining the second autonomous drive mode.

2. The method according to claim 1 wherein the autonomous braking maneuver brakes the vehicle to a stop when the at least one request initiated by a user lasts for a time period.

3. The method according to claim 1 further comprising:
   before the autonomous braking maneuver brakes the vehicle to a stop, determining a stop position for the vehicle to stop.

4. The method according to claim 1 wherein the autonomous braking maneuver comprises controlling longitudinal and lateral movement of the vehicle.

5. The method according to claim 1 wherein one of the at least one request initiated by a user is initiated by the user by activating a brake triggering device comprised in the vehicle.

6. The method according to claim 5 wherein the brake triggering device is a dedicated autonomous brake triggering device.

7. The method according to claim 5 wherein the brake triggering device is an Electric Parking Brake, EPB, activation device.

8. The method according to claim 5 wherein activating a brake triggering device comprises arbitration between activating the autonomous braking maneuver and activating an Electric Parking Brake, EPB, dynamic braking maneuver.

9. The method according to claim 8 wherein the first request activates the autonomous braking maneuver and the second request activates the EPB dynamic braking maneuver.

10. The method according to claim 8 wherein the one of the at least one request initiated by a user initially activates the autonomous braking maneuver and activates the EPB dynamic braking maneuver when the one request lasts for a time period.

11. An autonomous vehicle comprising an autonomous drive system and an autonomous braking maneuver arrangement configured to:

detect at least one request initiated by a user for an autonomous braking maneuver of the vehicle when the vehicle is in a first autonomous drive mode at a speed, wherein the autonomous braking maneuver is at least one of speed reduction or stop; and when a first request initiated by the user has been detected, activate the autonomous braking maneuver to reduce the speed of the vehicle to a reduced speed without stopping the vehicle, and when a second request initiated by the user has been detected following the first request, cause braking of the vehicle from the reduced speed to a stop wherein the vehicle is in a second autonomous drive mode when the vehicle is driving at the reduced speed, and wherein the autonomous drive system is further configured to:

detect whether the autonomous drive system is fault free;

when the autonomous drive system is fault free and the vehicle is in the second autonomous drive mode, request input from a user indicating whether the first autonomous drive mode of the vehicle should be resumed;

when the autonomous drive system is fault free and the vehicle is in the second autonomous drive mode, request input from the user indicating whether the second autonomous drive mode should be maintained;

receive via user activation of an input unit a user response indicating that the first autonomous drive mode should be resumed or that the second autonomous drive mode should be maintained; and based on the user response received via user activation of the input unit, resume the first autonomous drive mode or maintain the second autonomous drive mode.

12. The vehicle according to claim 11 wherein the autonomous braking maneuver arrangement comprises at least one processor and a non-transient computer readable storage medium having stored thereon instructions that are executable by the at least one processor to cause the autonomous braking maneuver arrangement to activate the autonomous braking maneuver when the request has been detected.

13. The vehicle according to claim 11 further comprising a brake triggering device for initiating the at least one request initiated by a user.

14. The vehicle according to claim 13 wherein the brake triggering device is a dedicated autonomous brake triggering device.

15. The vehicle according to claim 13 wherein the brake triggering device is an Electric Parking Brake, EPB, activation device.

* * * * *